(12) United States Patent
Kawakami (10) Patent No.: US 6,598,713 B1
(45) Date of Patent: Jul. 29, 2003

(54) HYDRAULIC LOCKING DEVICE

(75) Inventor: Takayuki Kawakami, Itami (JP)

(73) Assignee: Pascal Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/694,623

(22) Filed: Oct. 23, 2000

Related U.S. Application Data

(63) Continuation of application No. PCT/JP99/05823, filed on Oct. 21, 1999.

(30) Foreign Application Priority Data

Feb. 24, 1999 (JP) .......................................... 11-046922

(51) Int. Cl.$^7$ ............................................. B65H 59/10
(52) U.S. Cl. ..................... 188/67; 188/265; 269/309; 60/593
(58) Field of Search ..................... 188/67, 265; 60/593, 60/583; 269/309, 310

(56) References Cited

U.S. PATENT DOCUMENTS

| | | | | |
|---|---|---|---|---|
| 3,542,354 A | * | 11/1970 | Fitzpatrick .................... | 269/22 |
| 4,526,086 A | * | 7/1985 | Holton et al. .................. | 91/43 |
| 4,619,188 A | * | 10/1986 | Kimura ......................... | 92/26 |
| 4,714,289 A | * | 12/1987 | Arzenti et al. ............. | 294/119.3 |
| 4,989,909 A | * | 2/1991 | Bouligny, Jr. et al. ... | 294/119.3 |
| 5,355,707 A | * | 10/1994 | Inoue et al. .................. | 72/245 |
| 5,490,443 A | * | 2/1996 | Atsuta ........................... | 92/27 |
| 5,957,443 A | * | 9/1999 | Mascola ....................... | 269/22 |
| 6,152,268 A | * | 11/2000 | Goellner et al. .............. | 188/67 |

FOREIGN PATENT DOCUMENTS

| | | | |
|---|---|---|---|
| EP | 0 534 789 | * | 3/1993 |
| JP | 59-208207 | * | 11/1984 |

* cited by examiner

Primary Examiner—Jack Lavinder
Assistant Examiner—Bradley King
(74) Attorney, Agent, or Firm—Darby & Darby (57) ABSTRACT

A hydraulic intensifier generates a hydraulic pressure which is higher than the input hydraulic pressure generated in the discharge port and the outer periphery hydraulic pressure chamber. The hydraulic intensifier, provided inside a case member, has a discharge part connected with an outer periphery hydraulic pressure chamber. An input port supplies input hydraulic pressure from the exterior to an input oil chamber of hydraulic intensifier. Oil is filled in a sealed manner in outer periphery hydraulic pressure chamber.and discharge part. The hydraulic intensifier is driven by the input hydraulic pressure. The rod is locked by the elastic deformation of a thinned tube part of a sleeve body. A relatively small hydraulic locking device having a relatively high power is achieved. Furthermore, a relatively small hydraulic pressure source having reduced pressure is realized.

5 Claims, 8 Drawing Sheets

HYDRAULIC LOCKING DEVICE

This application is a continuation of PCT/JP99/05823 filed Oct. 21, 1999.

BACKGROUND TO THE INVENTION

The present invention relates to a hydraulic locking device whereby a rod is locked by a sleeve having elastic deformations which are elastically deformed by hydraulic pressure. More specifically, the present invention relates to a hydraulic locking device constructed so that the sleeve is elastically deformed by generating a high hydraulic pressure using a hydraulic intensifier provided inside a case member.

A conventional hydraulic locking device is used for clamping and supporting a workpiece locking it into a desired position for cutting, or the like, of the workpiece. For example, Japanese Utility Model Laid-open Patent Publication 59-128902 and Japanese Utility Model Laid-open Patent Publication 6-47710 describe this type of hydraulic locking device.

In Japanese Utility Model Laid-open Patent Publication 59-128902, a hydraulic locking device has an approximately cylindrical case member. A hollow piston member slidably fits inside the case member. The hollow piston member can be elastically deformed to have a smaller diameter. A rod, slidably fitting inside the hollow piston member, passes through the case member. According to this hydraulic locking device, by introducing oil into the hydraulic pressure chamber that is between the case member and the piston member, there is elastic deformation of the piston member, pressing the piston member into contact with the rod. The piston member and the rod are locked so that there is no relative displacement in the axial direction.

In Japanese Utility Model Laid-open Patent Publication 6-47710, a hydraulic locking device has a hydraulic cylinder equipped with a cylinder body and a piston member that slidably fits inside the cylinder body. A rod, passing through the cylinder body, has a piston member passing through it in the axial direction. An elastically deforming sleeve, between the piston member and the rod, fits outside the rod and is attached to the piston member, preventing relative displacement in the axial direction. According to this conventional hydraulic locking device, hydraulic pressure introduced to the hydraulic pressure chamber formed inside the piston member is transferred on the outer periphery of the sleeve, elastically deforming the sleeve. Thereupon, this sleeve is pressed into contact with the outer perimeter surface of the rod. The rod is locked to the piston member to prevent relative displacement.

In the hydraulic locking devices described in Japanese Utility Model Laid-open Patent Publication 59-128902 and Japanese Utility Model Laid-open Patent Publication 6-47710, the sleeve, which is either integral with the piston member or is separate from the piston member, is elastically deformed to have a smaller diameter due to the hydraulic pressure. The rod is locked by the static frictional force acting between the sleeve and the rod. With this construction, if the hydraulic pressure to elastically deform the sleeve is a low pressure, the locking force is small. In order to generate a large locking force, a large locking device is necessary. This is disadvantageous in terms of equipment costs. Otherwise, a high-pressure hydraulic pressure must be supplied from the hydraulic pressure supply source. This causes the hydraulic pressure supply source to become large, and also results in hydraulic pressure leaks being more easily generated. This results in a bulky and expensive hydraulic locking device.

OBJECT AND SUMMARY OF THE INVENTION

It is an object of the present invention to provide a hydraulic locking device which overcomes the foregoing problems.

More specifically, it is an object of the present invention to devise a smaller, high powered hydraulic locking device.

It is another object of the present invention to devise a smaller and a lower pressure hydraulic pressure supply source.

Briefly stated, the present invention provides a hydraulic intensifier which generates a hydraulic pressure that is higher than the input hydraulic pressure generated in the discharge port and the outer periphery hydraulic pressure chamber. The hydraulic intensifier, provided inside a case member, has a discharge part connected with an outer periphery hydraulic pressure chamber. An input port supplies input hydraulic pressure from the exterior to an input oil chamber of hydraulic intensifier. Oil is filled in a sealed manner in outer periphery hydraulic pressure chamber and discharge part. The hydraulic intensifier is driven by the input hydraulic pressure. The rod is locked by the elastic deformation of a thinned tube part of a sleeve body. A relatively small hydraulic locking device having a relatively high power is achieved. Furthermore, a relatively small hydraulic pressure source having reduced pressure is realized.

The present invention is a hydraulic locking device having a rod as an output member. A sleeve body, fitting outside the rod, is equipped with a thinned tube part that can be elastically deformed to a smaller diameter. A case member supports the sleeve body. An outer periphery hydraulic pressure chamber is formed on the outer periphery side of the thinned tube part of the sleeve body. A hydraulic intensifier, provided inside the case member, has a discharge part continuous with the outer periphery hydraulic pressure chamber. An input port supplies input hydraulic pressure from the exterior to the input oil chamber of the hydraulic intensifier. Oil that is filled, in a sealed manner, in the outer periphery hydraulic pressure chamber and discharge part. The hydraulic intensifier is driven by the input hydraulic pressure supplied from the input port. Hydraulic pressure, having a higher pressure than the input hydraulic pressure, is generated in the discharge part and outer periphery hydraulic pressure chamber. Locking of the rod being is conducted by elastically deforming the thinned tube part of the sleeve body to a smaller diameter.

An example wherein the workpiece being supplied for machining is supported from underneath by the hydraulic locking device will be described. The workpiece is supplied from above the hydraulic locking device. While the rod is in contact with this workpiece, the rod is pushed downward. When the workpiece reaches the desired height, input hydraulic pressure is supplied from the input port to the input oil chamber of the hydraulic intensifier. Thereupon, driving the hydraulic intensifier results in a hydraulic pressure that is higher than the input hydraulic pressure is generated in the outer periphery hydraulic pressure chamber on the outer periphery of the sleeve and in the discharge part. Next, the thinned tube part of the sleeve body is elastically deformed to a smaller diameter, securely locking the rod. In particular, because the hydraulic intensifier is driven by a low input hydraulic pressure and the oil, which is filled in a sealed manner in the outer periphery hydraulic pressure chamber and the discharge part, is intensified to a higher pressure than the input hydraulic pressure, a high powered locking device can be devised without requiring a large locking device. The hydraulic pressure supply source is thus made smaller and has a reduced pressure.

The hydraulic intensifier has an annular piston member that fits outside the sleeve body. The discharge part of the hydraulic intensifier is preferably formed on the outside periphery of the thinned tube part of the sleeve body. The hydraulic intensifier can be provided inside the case member without having to increase the diameter of the case member. The space on the outer periphery of the sleeve body is thus effectively used.

A spring housing hole, open on one end, is formed near the shaft core of the rod. A spring bearing member is inserted partially in this spring housing hole in a manner allowing for relative displacement. The spring bearing is affixed to the bottom wall of the case member. A compression spring is attached to the spring housing hole and is stopped by the spring bearing member is provided. The rod is preferably elastically impelled towards the other end by the compression spring. The rod is constantly elastically impelled towards the other end by the elastic impelling force of the compression spring.

A spring housing hole, open on one end, is formed near the shaft core of the rod. A spring is housed in the spring housing hole, and a spring bearing piston member receives one end of the spring. It is preferable to have a hydraulic pressure chamber that has hydraulic pressure acting on the spring bearing-piston member, receiving an external supply of hydraulic pressure. When a low input hydraulic pressure is supplied to the hydraulic pressure chamber from the input port, the spring bearing piston member slides to the other end in opposition of the impelling force of the spring, compressing the spring. Thereupon, the rod is shifted to the other end and contacts the workpiece that is provided on top of this device. Next, driving the hydraulic intensifier, and a hydraulic pressure, of higher pressure than the input pressure, is generated in the outer periphery hydraulic pressure chamber and discharge part. By this, the thinned tube part of the sleeve body is elastically deformed to a smaller diameter, securely locking the rod.

The above hydraulic intensifier preferably has a piston member housing hole formed inside the inner wall of the case member at a position separated from the sleeve body. The hydraulic intensifier preferably also has a piston member that is housed shiftably in the piston member housing hole and that has a pressure receiving part and a pressure applying part. The workpiece is in contact with the rod and is pushed. At the desired height of the workpiece, a low-pressure input hydraulic pressure from the input port is received by the pressure receiving part of the piston member. Thereupon, the piston member slides inside the piston member housing hole. The oil in the discharge part is pressurized by the pressure applying part. A hydraulic pressure of higher pressure than the input hydraulic pressure is generated in the outer periphery hydraulic pressure chamber and the discharge part. By this, the thinned tube part of the sleeve body is elastically deformed to a smaller diameter, and securely locking the rod.

The above rod is preferably provided so that it protrudes to the exterior from one end of the case member. With this hydraulic locking device, the workpiece used in machining is pressed into contact with the rod and is pushed. At the desired position, the rod is locked, and the workpiece can be securely supported by clamping and the like.

The above rod is preferably provided so that it passes through the sleeve body and case member. As a result, after adjusting the rod which passes through the sleeve body and case member to the desired position, the input hydraulic pressure is supplied and the rod can be locked.

The above, and other objects, features and advantages of the present invention will become apparent from the following description read in conjunction with the accompanying drawings, in which like reference numerals designate the same elements.

DETAILED DESCRIPTION OF THE INVENTION

Referring to the figures, the embodiments of the present invention will be described.

Figure 1:
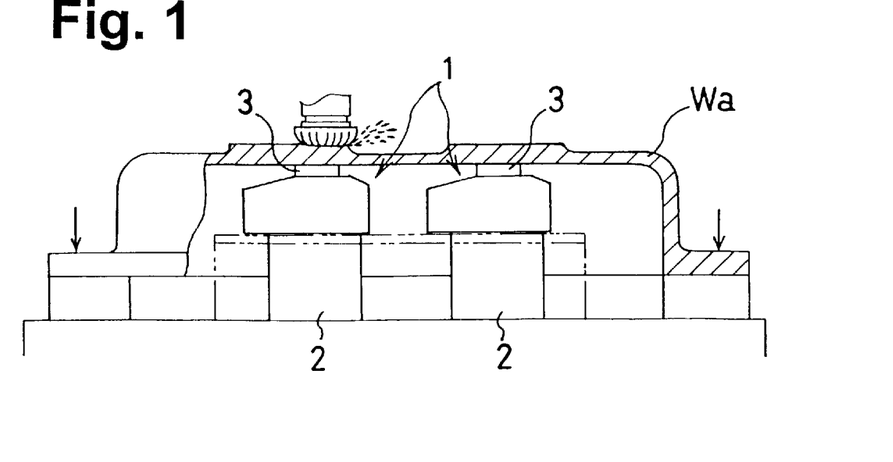
FIG. 1 is a front schematic view an example where the hydraulic locking device of the present invention is used as a workpiece support.

Referring to FIG. 1, the present embodiment is an example of when the present invention is used in a workpiece supporting device. A hydraulic locking device 1 of the present embodiment is a workpiece supporting device for preventing the vibration of a workpiece Wa during machining by supporting the central part of workpiece Wa from the underside.

Referring now to FIGS. 1 through 6, hydraulic locking device 1 includes an approximately cylindrical case member 2, formed so that from one end (the lower end in FIG. 2) to the upper end, the external part is open. A rod 3, is the output member for cylindrical case member 2. A metal sleeve body 4, an outer periphery hydraulic pressure chamber 5, and a hydraulic intensifier 7 are within cylindrical case member 2.

Figure 2:
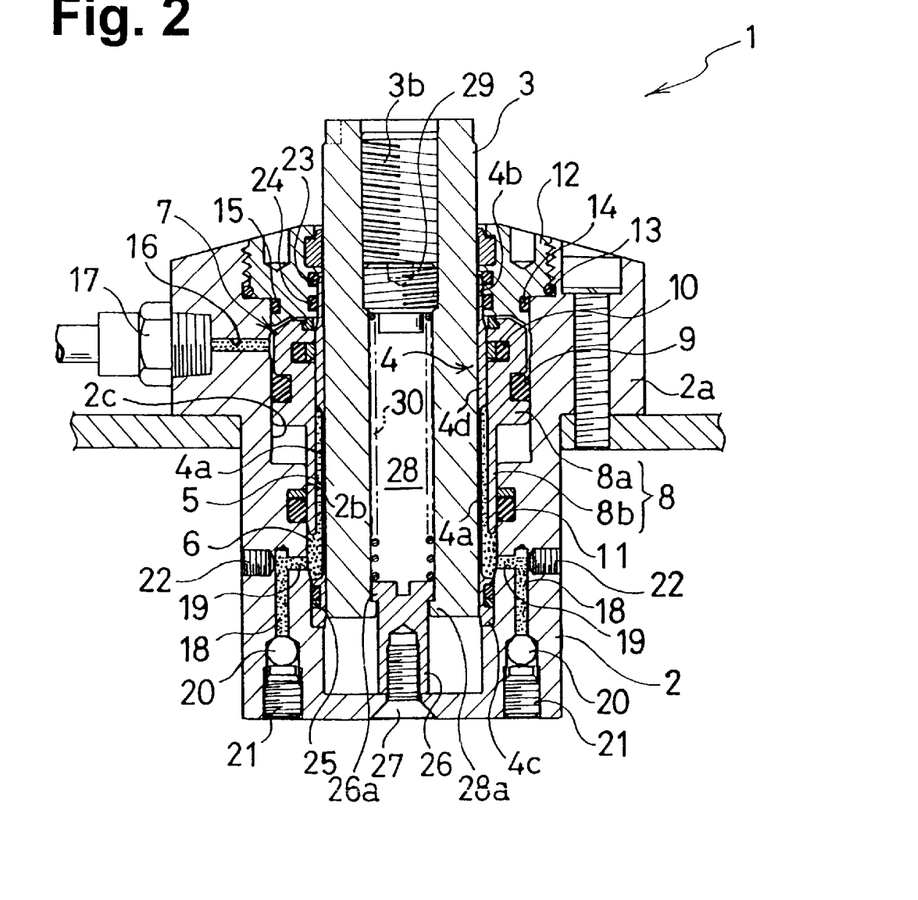
FIG. 2 is a vertical cross-sectional diagram, along line II—II of FIG. 3, of the hydraulic locking device of the present invention.
Figure 3:
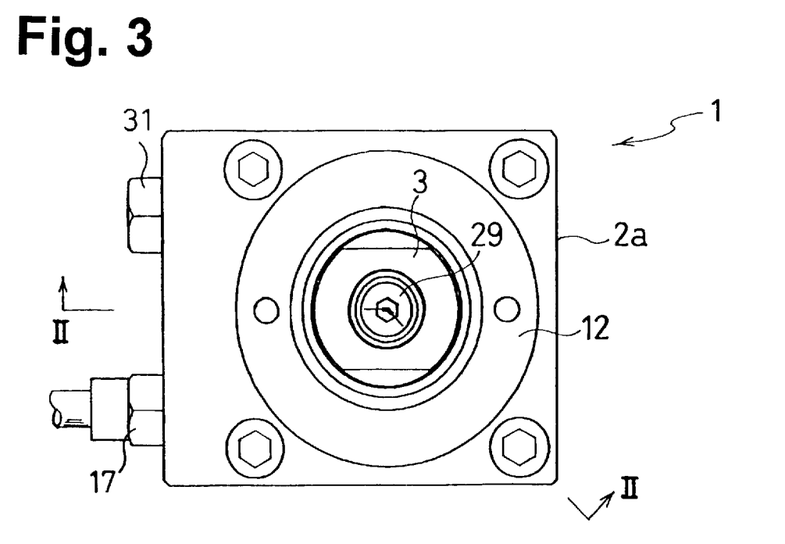
FIG. 3 is a plan view of the hydraulic locking device according to the present invention.

A flange part 2a, which is rectangular from a plan view, is formed on the upper approximately one-third portion of case member 2. Furthermore, a rod housing hole 2b for rod 3 is in case member 2. A piston housing hole 2c, having a larger diameter than rod housing hole 2b, is on the approximately upper half of the inside of case member 2. A ring-shaped lid 12 is removably screwed onto the upper end of case member 2 so that lid 12 covers piston housing hole 2c.

Figure 4:
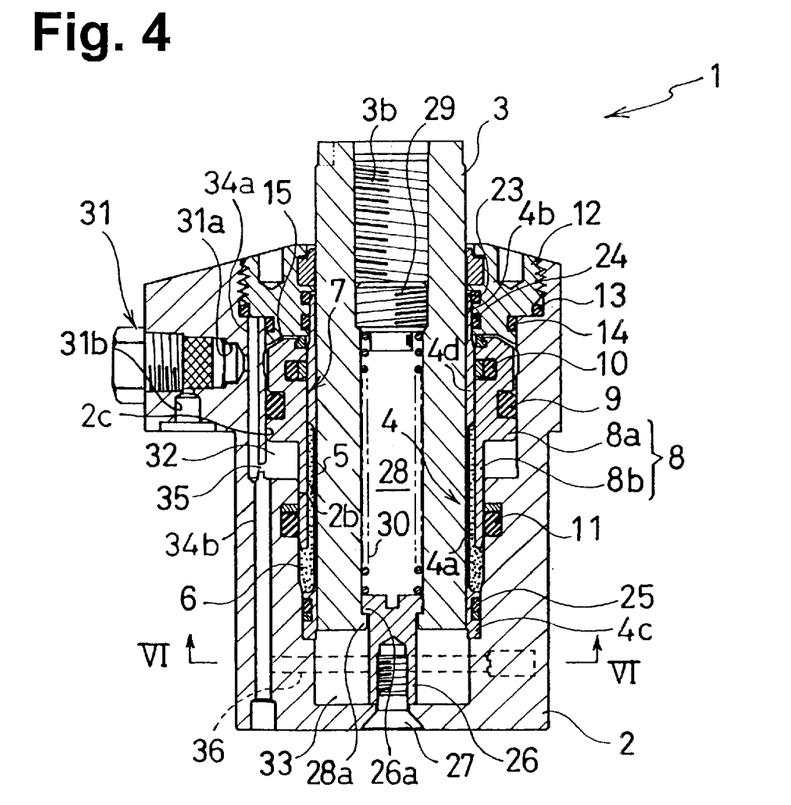
FIG. 4 is a vertical cross-sectional diagram, along line IV—IV of FIG. 5, of the hydraulic locking device of the present invention.

Referring now specifically to FIGS. 2 and 4, sleeve body 4 comprises, in order from top to bottom, a fastening ring upper part 4b, a middle tube part 4d, a thinned tube part 4a, and a fastening ring lower part 4c. Fastening ring upper part 4b is affixed to lid part 12 of case member 2. Fastening ring lower part 4c is affixed to rod housing hole 2b of case member 2. In particular, thinned tube part 4a is constructed so that it can be elastically deformed to a smaller diameter. An annular outer periphery hydraulic pressure chamber 5 is formed on the outside of thinned tube part 4a.

An annular piston member 8, fitted outside sleeve body 4, is housed in piston housing hole 2c. Hydraulic intensifier 7 includes piston member 8, an input oil chamber 15, and a discharge part 6. Discharge part 6 is continuous with outer periphery hydraulic pressure chamber 5. Outer periphery hydraulic pressure chamber 5 and discharge part 6 are filled with oil and sealed.

A spring member 26 is affixed, on the bottom wall of case member 2, to the center position of rod housing hole 2b by a bolt 27. Spring bearing member 26 is a solid cylinder with approximately ⅓ the diameter of the bottom wall of case member 2. A catching part 26a with a somewhat large outer diameter is formed at the end of spring bearing member 26.

A spring housing hole 28, opened at one end (the lower end in the Figs.), is formed near the shaft core of rod 3. An engaging part 28a, engaging with catching part 26a of spring bearing member 26, is on one end of spring housing hole 28. Spring bearing member 26 is partially and shiftably inserted in spring housing hole 28. Inside rod 3, a screw hole 3b, continuous with spring housing hole 28, is formed from the top to approximately ⅓ of the entire length of rod 3. An adjusting screw 29 is screwed into screw hole 3b. A compression spring 30, stopped by spring bearing member 26, is attached inside spring housing hole 28. Compression spring 30 has the function of elastically impelling adjusting screw 29, or in other words rod 3, towards the other end (towards the top in the Figures). Furthermore, compression spring 30 is constructed so that the impelling force can be changed to the desired strength by adjusting the vertical position of adjusting screw 29.

Piston member 8 of hydraulic intensifier 7 comprises an annular large diameter part 8a, on approximately the top half of piston member 8, and an annular small diameter part 8b, on the lower half. Large diameter part 8a and small diameter part 8b are formed coaxially. Large diameter part 8a slidably fits both inside piston housing hole 2c and outside of sleeve body 4. Small diameter part 8b slidably fits inside rod housing hole 2b. Input oil chamber 15 of hydraulic intensifier 7 is demarcated by the lower surface of lid part 12, piston housing hole 2c, the upper surface of large diameter part 8a of piston member 8, and outer perimeter surface of sleeve body 4. An input port 16 supplies input hydraulic pressure from the exterior to input oil chamber 15. Input port 16 and a connection metal fitting 17 are provided in the horizontal direction on the upper part inside case member 2.

On the lower part of case member 2, a pair of oil passages 18 are provided symmetrically on the right and left of FIG. 2 and in parallel with the axis of rod 3. Oil passages 18 fill oil into outer periphery hydraulic pressure chamber 5 and discharge part 6. A communication hole 19 connects oil passage 18, outer periphery hydraulic pressure chamber 5, and the discharge part in the horizontal direction. A ball 20 for sealing the oil after filling and a fastening machine screw 21 are provided removeably on the base end of each oil passage 18. A plug 22 is provided on the base end of communication hole 19.

Case member 2 is provided with a filter, a connection metal fitting 31, a port 31a, a breathing hole 31b, a breathing passage 34a, a breathing passage 34b, and a breathing passage 36. These elements are used for the breathing of actuation chamber 32 and actuation chamber 33. Actuation chamber 32 is the annular space demarcated by the lower surface of large diameter part 8a of piston member 8, piston housing hole 2c, and the outer perimeter surface of small diameter part 8b. Actuation chamber 33 is the annular space demarcated by the lower surface of rod 3, rod housing hole 2b, the bottom wall part of case member 2, and spring bearing member 26.

Figure 5:
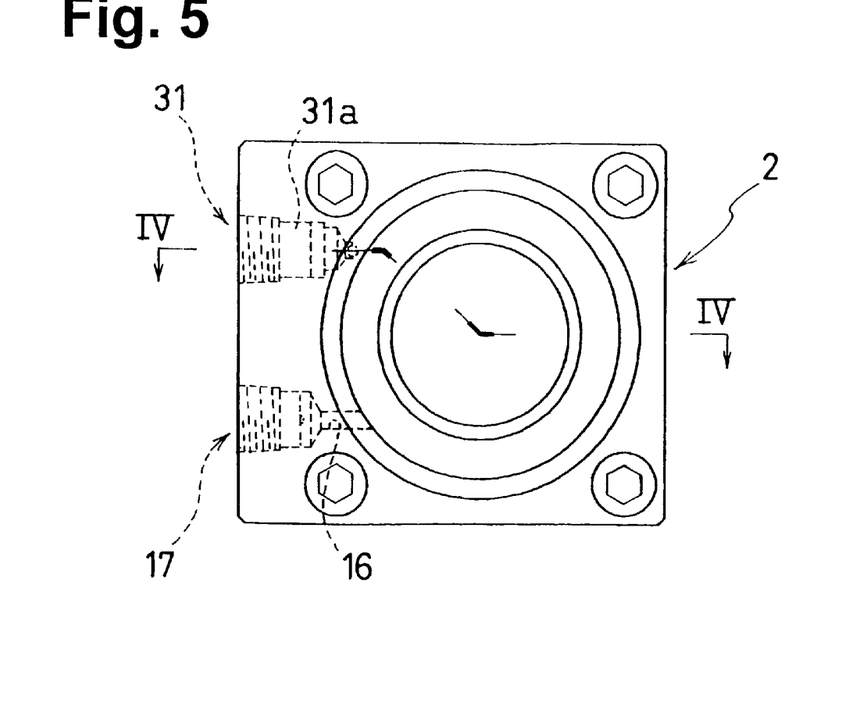
FIG. 5 is a layout drawing of the oil conduits and air conduits in the case member.
Figure 6:
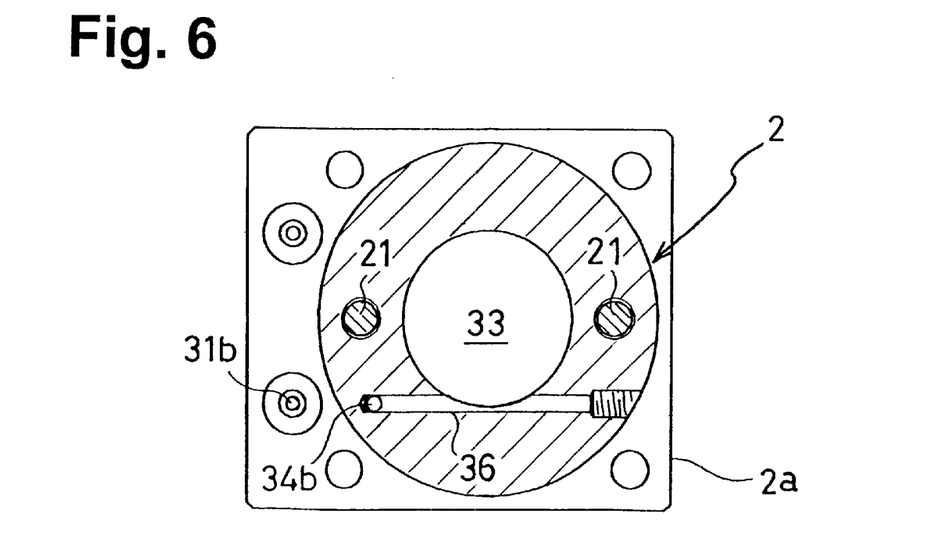
FIG. 6 is a cross-sectional diagram along line VI—VI of FIG. 4.

Stated more concretely, at the upper part of case member 2, from a plan view, port 31a and connection metal fitting 31 are disposed in a front-back symmetric position with input port 16 (see FIG. 5). Breathing passage 34, communicating with port 31a, is disposed in a vertical direction. Breathing passage 34 is continuous with actuation chamber 32, actuation chamber 33 via breathing passage 35, and breathing passage 36, which are disposed in the horizontal direction. There are also sealing members 9–11, 13, 14, 23–25.

Next, the action of hydraulic locking device 1 will be described.

With respect to rod 3, which protrudes out by the impelling force of compression spring 30, the workpiece is placed into contact with the end of rod 3. In opposition with the impelling force of compression spring 30, rod 3 is pushed downward. When the workpiece reaches the desired height, a low pressure input hydraulic pressure is supplied from connection metal fitting 17 to input oil chamber 15 through input port 16. Thereupon, piston member 8 of hydraulic intensifier 7 shifts downward, and a hydraulic pressure that is higher than the input hydraulic pressure is generated in outer periphery hydraulic pressure chamber 5 and discharge part 6. By this, thinned tube part 4a of sleeve body 4 is elastically deformed to a smaller diameter to securely pressed it into contact with rod 3. Rod 3 is locked by the frictional force acting between sleeve body 4 and rod 3.

Stated more concretely, for example, the surface area ratio of the pressure receiving surface area of the upper surface of large diameter part 8a of piston member 8 to the pressure applying surface area of the lower surface of small diameter part 8b is set at 3:1. Thereupon, when an input hydraulic pressure of 140 kg/cm$^2$ is supplied to input oil chamber 15, the hydraulic pressure generated in outer periphery hydraulic pressure chamber 5 and discharge part 6 is intensified by the surface area ratio of three times to a pressure of 420 kg/cm$^2$. The above surface area ratio is only one example and is not limited to 3:1, and the input hydraulic pressure is not limited to 140 kg/cm$^2$.

As a result, even with a heavy weight workpiece, the workpiece is reliably supported by hydraulic locking device 1. Compared to the conventional hydraulic locking devices, a smaller, high-powered hydraulic locking device is achieved, miniaturizing and reducing the pressure of the hydraulic supply source. Discharge part 6 of hydraulic intensifier 7 is formed on the outer periphery of thinned tube part 4a of sleeve body 4. As a result, the space on the outer periphery of sleeve body 4 is effectively used, and hydraulic intensifier 7 can be provided inside case member 2. As a result, the miniaturization of hydraulic locking device 1 is achieved even while internalizing hydraulic intensifier 7 in hydraulic locking device 1. Rising manufacturing costs are therefore significantly suppressed.

Next, partial modifications of the present embodiment will be described. Elements that are the same or roughly the same as the elements in the above embodiment are given the same numerals, and detailed descriptions are omitted.

Hydraulic Locking Device 1A

Referring to FIGS. 7 through 10, hydraulic locking device 1A includes a case member 2, a rod 40, a metal sleeve body 4, an outer periphery hydraulic pressure chamber 5, and a hydraulic intensifier 7. A rod housing hole 2b, for rod 40, is formed in case member 2. A piston housing hole 2c, having a, larger diameter than rod housing hole 2b, is on approximately the upper half of the inside of case member 2. A ring-shaped lid 12 is removably screwed onto the upper end of case member 2 so that lid 12 covers piston housing hole 2c. The bottom end of case member 2 is closed by attaching a bottom plate member 41 so that case member 2 has a construction of a tube with a bottom.

Figure 7:
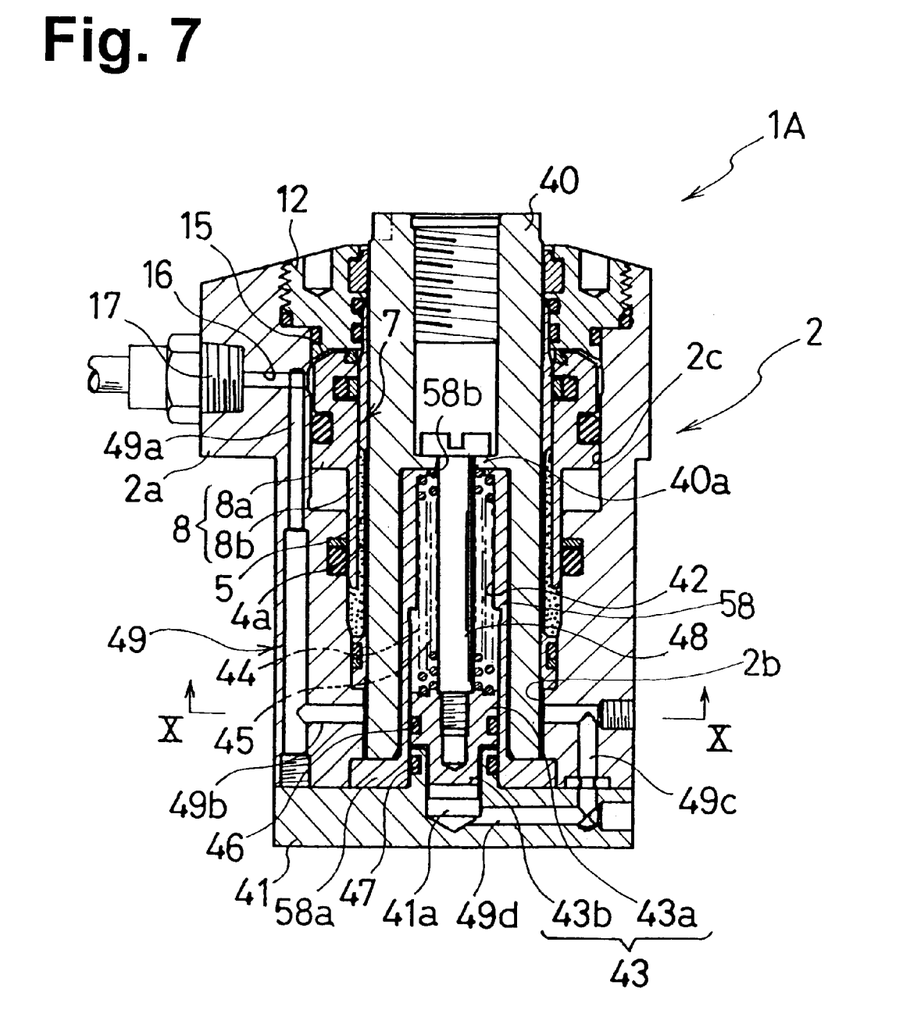
FIG. 7 is a vertical cross-sectional figure, taken along line VII—VII, of the hydraulic locking device according to a first modification mode of the present invention.
Figure 8:
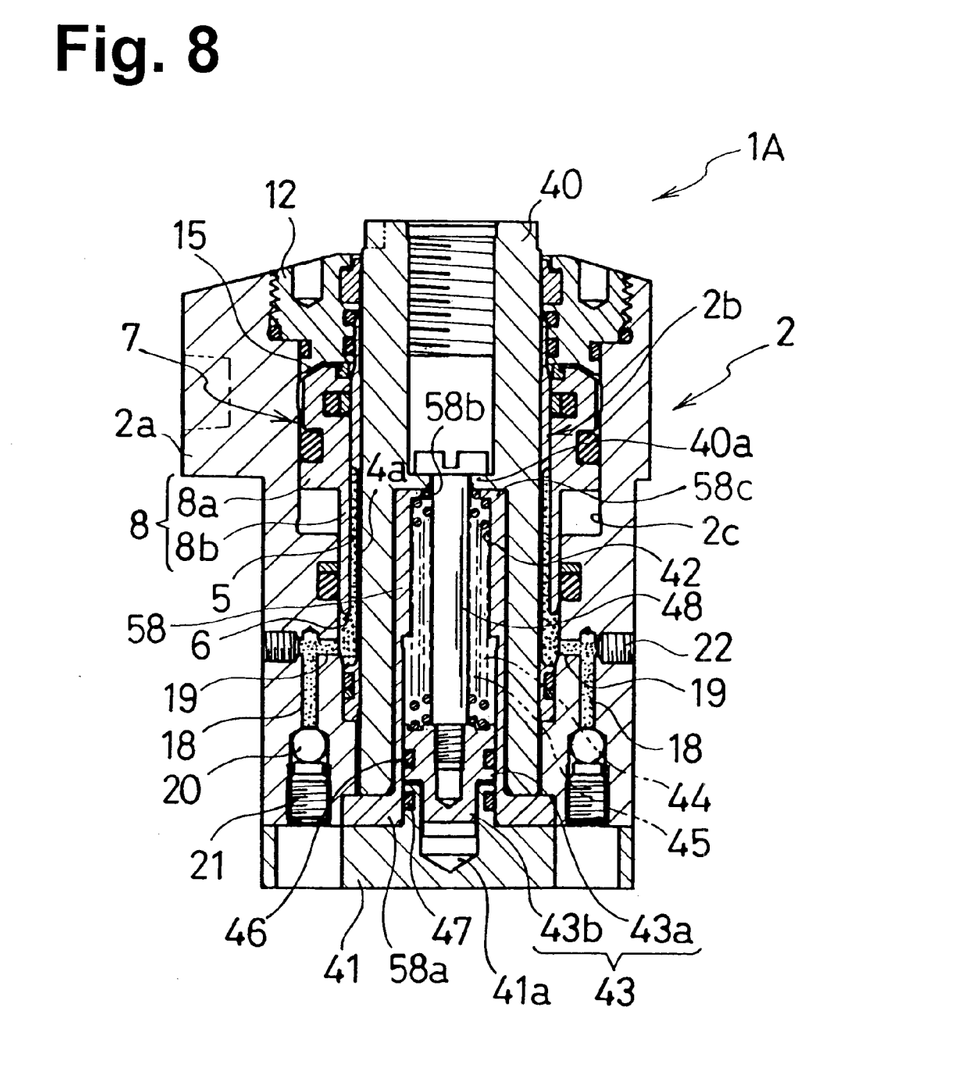
FIG. 8 is a vertical cross-section of the hydraulic locking device of FIG. 7.

From the bottom end of rod 40, a spring housing hole 42, having a length of approximately one half the entire length of rod 40, is formed near the shaft core of rod 40. A tubular spring housing member 58 fits inside spring housing hole 42. A flange 58a is on one end (lower end in the Figures.) of spring housing member 58, which is open at the lower end. An opening 58b is on the other end (upper end) of spring housing member 58. Flange 58a is interposed and affixed between bottom plate member 41 and the lower end of case member 2. A spring bearing piston member 43, being slidable at a specified stroke, is provided on the interior of spring housing member 58. Double springs 44 and 45 are housed in the interior of spring-housing member 58.

One end of spring 44, spring 45 is stopped by spring bearing piston member 43. The other end (upper end) of outer spring 44 is stopped by upper plate 58c of spring housing member 58. The other end of inner spring 45 passes through opening 58b and is stopped by middle wall part 40a, provided near the middle of the inside of rod 40. Spring bearing member 43 includes a large diameter part 43a and a small diameter part 43b. Large diameter part 43a slidably inserts into spring housing member 58. Small diameter part 43b slidably inserts into an oil hole formed on bottom plate member 41 and demarcates hydraulic pressure chamber 41a. There are sealing members 46 and 47.

A screw hole is formed in the axial direction of large diameter part 43a of spring bearing piston member 43. A bolt 48, threading into this screw hole, passes through the interior of double springs 44 and 45 as well as passing through middle wall part 40a and is provided in a unitary manner with piston member 43. An opening, through which the head of bolt 48 is inserted, is formed above middle wall part 40a inside rod 40.

Figure 9:
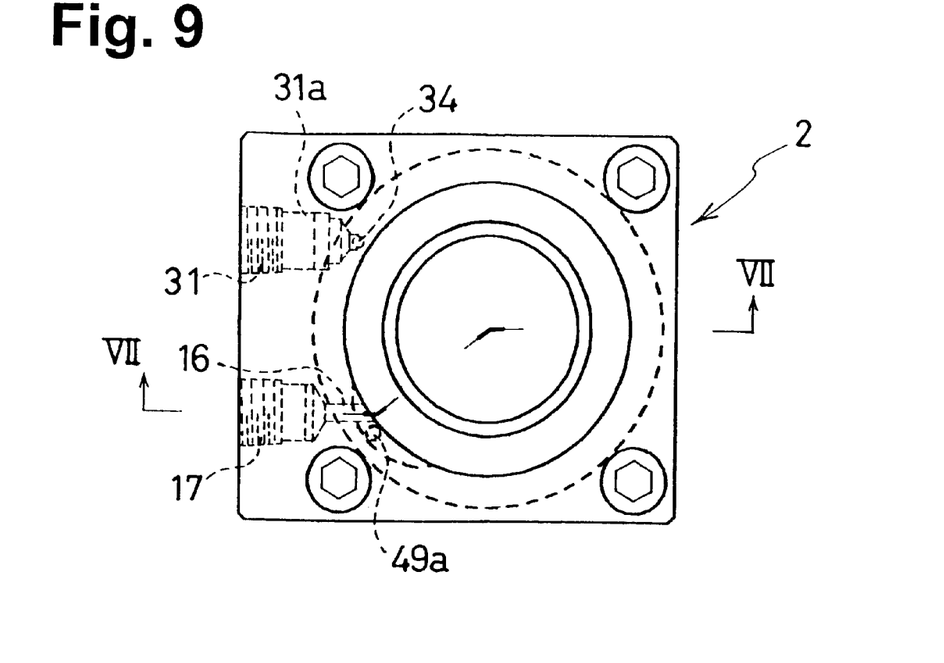
FIG. 9 is a layout drawing of the oil conduit and air conduit of the case member.
Figure 10:
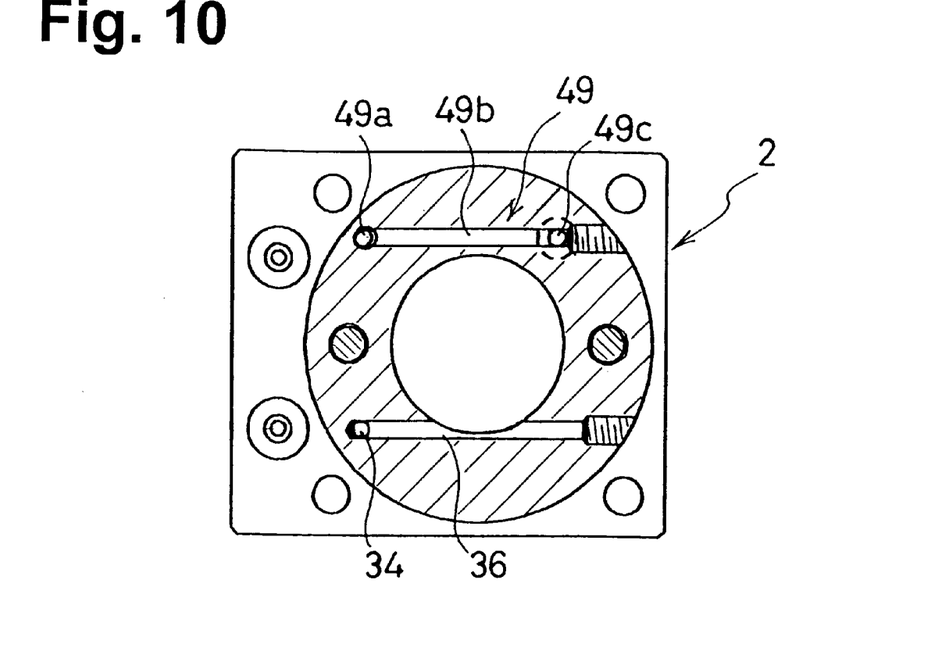
FIG. 10 is a cross-section along line X—X of FIG. 7.
Figure 11:
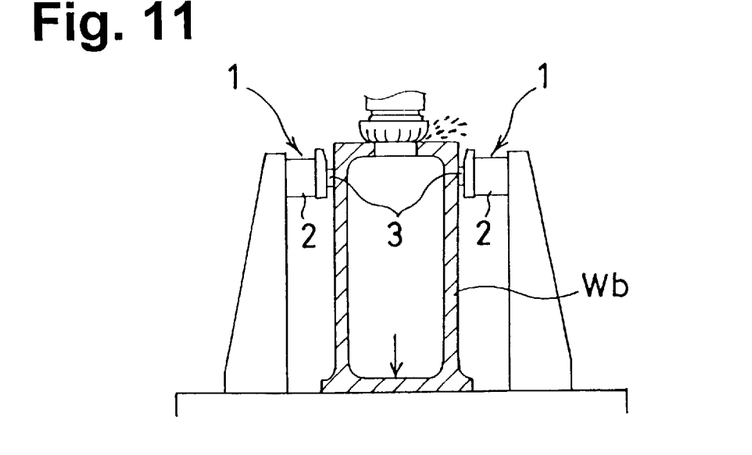
FIG. 11 is a vertical cross-sectional diagram showing an example where the hydraulic locking device is used as a clamping device.

An oil passage 49, formed inside the wall thickness of case member 2 and in bottom plate member 41, communicates input port 16 to hydraulic pressure chamber 41a. Oil passage 49 supplies hydraulic pressure to hydraulic pressure chamber 41a. Oil passage 49 comprises oil passage 49a~oil passage 49d. Oil passage 49a is placed in the vertical direction from input port 16 to bottom plate member 41. Oil passage 49b is placed horizontally from the bottom of oil passage 49a. Oil passage 49c is placed vertically downward from the end of oil passage 49b to inside bottom plate member 41. Oil passage 49d is placed horizontally from the end of oil passage 49c to hydraulic pressure chamber 41a.

Therefore, by supplying hydraulic pressure to hydraulic pressure chamber 41a, spring bearing piston member 43 slides upwards, and the impelling force of spring 45 is transmitted to middle wall part 40a of rod 40. As a result, rod 40 shifts to the other end and presses into contact with the workpiece.

An annular space is demarcated by the lower surface of large diameter part 8a of piston member 8, piston housing hole 2c, and outer perimeter surface of small diameter part 8b. Breathing holes or breathing passages for piston member 8 are formed from this annular space, passing vertically downward to bottom plate member 41. During the assembly of hydraulic locking device 1A, the stroke amount of piston member 8 is measured by inserting pins and the like into these breathing holes. The breathing holes are used to confirm whether or not the necessary amount of oil has been enclosed in outer periphery hydraulic pressure chamber 5 and discharge part 6. These pins can be removed after assembly is completed.

Next, the action of hydraulic locking device 1A will be described.

Referring specifically to FIG. 7, when rod 40 is withdrawn, a low input hydraulic pressure is supplied from connection metal fitting 17 to hydraulic pressure chamber 41a through input port 16, oil passage 49a, oil passage 49b, oil passage 49c, and oil passage 49d. Thereupon, spring bearing piston member 43 shifts to the other end in opposition to the impelling force of spring 44 and spring 45, compressing spring 44 and spring 45. Thereupon, rod 40 shifts toward the other end and contacts the workpiece. Next, piston member 8 of hydraulic intensifier 7 slides slightly downward, and, as with the above embodiment, a hydraulic pressure higher than the input hydraulic pressure is generated in the outer periphery hydraulic pressure chamber 5 and discharge part 6. By this, the thinned tube part 4a of sleeve body 4 is elastically deformed to a smaller diameter and is securely pressed into contact with rod 40, locking rod 40.

Hydraulic Locking Device 1B

Figure 12:
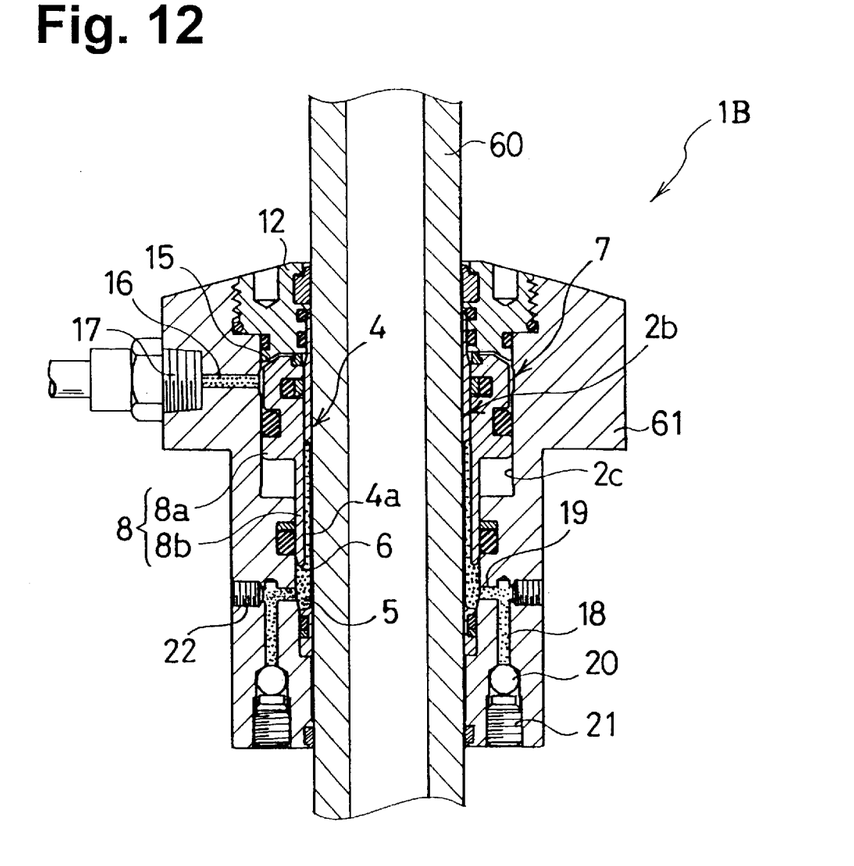
FIG. 12 is a vertical cross-section of a hydraulic locking device relating to a second modification mode of the present invention.

Referring to FIG. 12, a hollow rod 60 penetrates through sleeve body 4 and case member 61. The remainder is the same construction as the above hydraulic locking device 1. According to hydraulic locking device 1B, the workpiece is placed below the device, and the workpiece is securely clamped by the lower end of rod 60. Hydraulic locking device 1B can be used for devices other than workpiece supporting devices and clamping devices. For example, with respect to the long rod 60, a pair of hydraulic locking devices 1B and a hydraulic cylinder that moves each hydraulic locking device 1B along rod 60 can be provided. The pair of hydraulic locking devices 1B work cooperatively to drive the long rod 60 up and down.

Hydraulic Locking Device 1C

Figure 13:
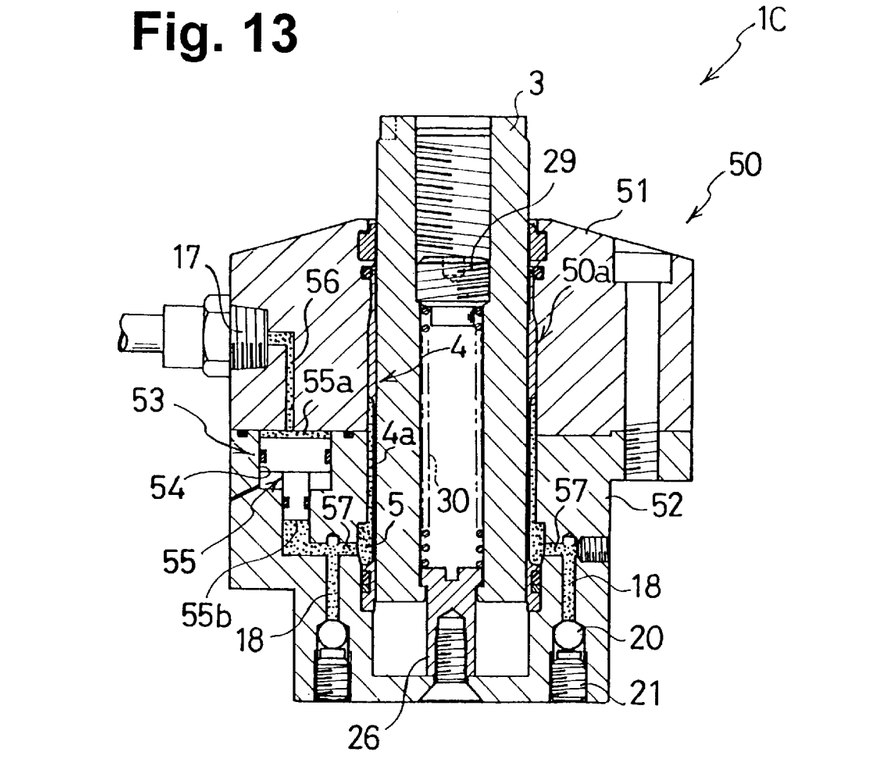
FIG. 13 is a vertical cross-sectional diagram of a hydraulic locking device relating to the third modification mode.

Referring to FIG. 13, hydraulic locking device 1C is equipped with an approximately cylindrical case member 50 that is formed so that it is open from one end (lower end) to the upper exterior. Case member 50 is constructed by joining a vertically split upper case 51 and lower case 52. Hydraulic locking device 1B comprises upper case 51, lower case 52, rod 3, sleeve body 4, outer periphery hydraulic pressure chamber 5, and a hydraulic intensifier 53.

A piston member housing hole 54 is inside the wall thickness of lower case 52 at a position separated from sleeve body 4. Hydraulic intensifier 53 includes piston member housing hole 54 and a piston member 55, movably housed in piston member housing hole 54. Piston member 55 has a pressure receiving part 55a and a pressure applying part 55b. The surface area ratio of the pressure receiving surface area of pressure receiving part 55a to the pressure applying surface area of pressure applying part 55b is approximately 3:1.

An input port 56 and a connection metal fitting 17 are provided on upper case 51. A pair of oil passages 18 are placed in lower case 52. A communication hole 57, horizontally connecting oil passage 18 and outer periphery hydraulic pressure chamber 5, is formed on lower case 52. Pressure receiving part 55a of piston member 55 is continuous with input port 56. Pressure applying part 55b is continuous with communication hole 57 and oil passage 18. A ball 20 and a fastening machine screw member 21 are provided at the base end of each oil passage 18. Oil is filled from oil passage 18.

Otherwise, ball 20, fastening machine screw 21, spring bearing member 26, compression spring 30, adjusting screw 29 and the like have the same construction as in hydraulic locking device 1. According to hydraulic locking device 1C, pressure receiving surface area of pressure receiving part 55a of piston member 55 is set to be large with respect to the pressure applying surface area of pressure applying part 55b. As a result, the same action and advantages as the previous embodiment is achieved.

Hydraulic Locking Device 1D

Figure 14:
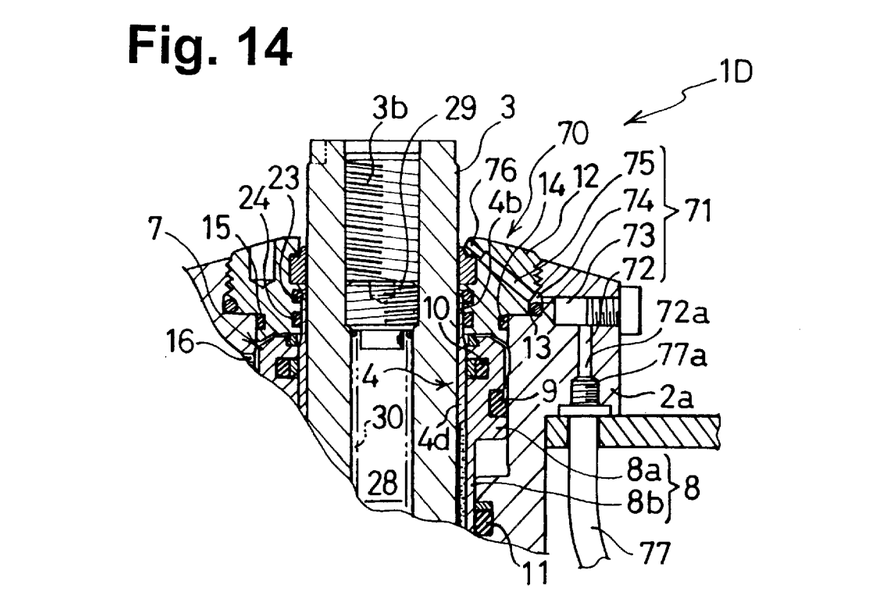
FIG. 14 is a vertical cross-sectional diagram of the essential parts of the hydraulic locking device of a fourth modification mode of the present invention.

Referring to FIG. 14, hydraulic locking device 1D is one in which, for the above hydraulic locking device 1A, an air blowing mechanism 70 is provided.

Air blowing mechanism 70 removes foreign substances, such as shavings from workpiece Wa, that adhere to the surface of rod 3, by blowing air onto rod 3 from near the upper end of lid 12. Air blowing mechanism 70 includes an air supply unit (not shown) for supplying air to case member 2 and an air passage 71 formed on case member 2 and lid 12. The air supplied to case member 2 is led to the upper inner rim of ring-shaped lid 12 by air passage 71. From air passage 71, air is blown onto the surface of rod 3.

Air passage 71 has air passages 72 and 73 on the interior of case member 2, an annular air passage 74 on top of sealing member 13 between case member 2 and lid 12, a plurality (four, for example) of air passages 75 on lid 12. Of these, air passages 75 extend diagonally upward towards the core of rod 3 from annular air passage 75. A nozzle part 76 is provided at the end of air passage 75. In addition, an air tube 77, extending from the air supply unit, connects via connection plug 77a to an air introducing port 72a on the lower end of air passage 72.

According to hydraulic locking device 1D, because the above air blowing mechanism 70 is provided, any foreign substances, such as shavings from workpiece Wa, adhering to the surface of rod 3 are reliably removed. In other words, because foreign substances, such as shavings from workpiece Wa, are prevented from entering between the surface of the advancing and retreating rod 3 and lid 12 and sleeve body 4, rod 3 is advanced and retreated smoothly. As a result, abrasion of sliding parts of rod 3 and lid 12 and sleeve body 4 is prevented.

Next, additional description relating to the modified examples will be given. Sleeve body 4 is metallic and preferably steel. However, it is not limited to metal. For example, sleeve body 4 may be made of FRP. In the present embodiments, the present invention was applied to hydraulic locking devices as workpiece supporting devices or clamping devices. However, the present invention can be similarly applied to hydraulic locking devices for various machine tools and industrial machinery.

Having described preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claim's.

As described above, according to the hydraulic locking device of the present invention, a smaller and a higher powered hydraulic locking device compared to the hydraulic locking device of the prior art is devised. A hydraulic pressure supply source that is smaller and of a lower pressure is devised. In addition, the present invention has various advantages such as the suppression of rising manufacturing costs, improved generalizability, and the like. The present invention is suitable for various devices for clamping and locking workpieces.

What is claimed is:

1. A hydraulic locking device, comprising:

a rod;

a sleeve body fitting outside said rod; said sleeve body having an elastically deformable thinned tube part;

a case member supporting said sleeve body;

an outer periphery hydraulic pressure chamber on an outer periphery of said thinned tube part of said sleeve body;

a hydraulic intensifier inside said case member, having a discharge part continuous with said outer periphery hydraulic pressure chamber;

an input port for supplying input hydraulic pressure from an: exterior of said hydraulic locking device to an input oil chamber of said hydraulic intensifier;

oil being sealed in said outer periphery hydraulic pressure chamber and said discharge part;

said hydraulic intensifier having an annular piston member fitted outside said sleeve body and an annular input hydraulic chamber;

said discharge part of said hydraulic intensifier is on an outer periphery of said thinned tube part of said sleeve body; and said rod being locked by driving said hydraulic intensifier with said input hydraulic pressure, said annular piston having an annular large diameter part proximal said input port and an annular smaller diameter part proximal said outer periphery hydraulic pressure chamber, whereby a hydraulic pressure that is higher than said input hydraulic pressure is generated in said outer periphery hydraulic pressure chamber to elastically deform said thinned tube part of said sleeve body to a smaller diameter frictionally locking said rod.

2. A hydraulic locking device as described in claim 1, further comprising:

a spring housing hole, having one end open, is formed near a shaft core of said rod;

a spring is housed in said spring housing hole;

a spring bearing piston receives one end of said spring; and a hydraulic pressure chamber, receiving a supply of hydraulic pressure from the exterior, actuates hydraulic pressure on said spring bearing piston member.

3. A hydraulic locking device as described in claim 1, wherein said rod passes through said sleeve body and said case member.

4. A hydraulic locking device, comprising:

a rod;

a sleeve body fitting outside said rod; said sleeve body having an elastically deformable thinned tube part;

a case member supporting said sleeve body;

an outer periphery hydraulic pressure chamber on an outer periphery of said thinned tube part of said sleeve body;

a hydraulic intensifier inside said case member, having a discharge part continuous with said outer periphery hydraulic pressure chamber;

said hydraulic intensifier having an annular piston member fitted outside said sleeve body;

an input port for supplying input hydraulic pressure from an exterior of said hydraulic locking device to an input oil chamber of said hydraulic intensifier;

oil being sealed in said outer periphery hydraulic pressure chamber and said discharge part;

a spring housing hole, said spring housing hole having one end open, and being formed proximal a shaft core of said rod;

a spring bearing member partially slidably inserted inside said spring housing hole and affixed to a bottom wall of said case member;

a compression spring attached to said spring housing hole and stopped by said spring bearing member at one end;

said rod is elastically impelled towards a spring housing hole opposite end by said compression spring; and said rod being locked by driving said hydraulic intensifier with said input hydraulic pressure, whereby a hydraulic pressure that is higher than said input hydraulic pressure is generated to elastically deform said thinned tube part of said sleeve body to a smaller diameter frictionally locking said rod.

5. A hydraulic locking device as described in claim 4, wherein said rod is provided protruding to the exterior from one end of said case member.

\* \* \* \* \*